United States Patent [19]

Lyons

[11] Patent Number: 5,230,560

[45] Date of Patent: Jul. 27, 1993

[54] ANTI-COLLISION LIGHT ASSEMBLY

[75] Inventor: Harold W. Lyons, Killingworth, Conn.

[73] Assignee: Whelen Technologies, Inc., Chester, Conn.

[21] Appl. No.: 817,581

[22] Filed: Jan. 7, 1992

[51] Int. Cl.⁵ .............................................. F21V 13/04
[52] U.S. Cl. ................... 362/297; 362/309; 362/310; 362/337; 362/363
[58] Field of Search ............... 362/297, 186, 308, 309, 362/310, 337, 339, 340, 327, 328, 325, 346, 363

[56] References Cited

U.S. PATENT DOCUMENTS

| | | | |
|---|---|---|---|
| 1,877,785 | 5/1932 | Andrews | 362/186 |
| 2,344,221 | 3/1944 | Trautner | 362/297 |
| 3,253,276 | 5/1966 | Nagel | 362/337 |
| 3,818,218 | 6/1974 | Heenan et al. | 362/297 |
| 4,869,074 | 11/1990 | Davis et al. | 362/329 |

Primary Examiner—Richard R. Cole
Attorney, Agent, or Firm—Chilton, Alix & Van Kirk

[57] ABSTRACT

A compact and highly efficient warning light for producing high intensity light pulses which are radiated in accordance with a desired directional pattern includes a light source and at least a first reflector disposed within a lens cover. The reflector is coaxial with the lens cover, includes plural parabolic reflective surfaces arranged in a symmetrical pattern and having a common focal point located on the axis of the lens cover, and reflects light in directions which are generally transverse to the lens cover axis. The lens cover is provided with internal optics which redirects light emitted by the source which is not reflected, such redirected light also being radiated in directions generally transverse to the lens cover axis.

20 Claims, 4 Drawing Sheets

FIG. I

ANTI-COLLISION LIGHT ASSEMBLY

BACKGROUND OF THE INVENTION

1. Field of the Invention

The present invention relates to warning lights and particularly to collision avoidance lights having no moving parts which are suitable for use on aircraft and other vehicles. More specifically, this invention is directed to a compact and efficient device for producing highly visible flashes of light and especially to a light assembly wherein light generated by a flash tube or incandescent lamp is directed, in part by reflection and in part by refraction, so as to provide the optimum radiation pattern for the intended use. Accordingly, the general objects of the present invention are to provide novel and improved apparatus of such character.

2. Description of the Prior Art

While not limited thereto in its utility, the present invention is particularly well suited for use as a replacement for the rotating beacon type of light which has found widespread usage as an anti-collision warning on aircraft. Such rotating beacons typically comprise a constantly energized lamp and a rotating or oscillating mirror, the lamp and mirror being covered by a transparent dome which may also function as a lens. Movement of the mirror causes the light generated by the lamp to appear to an observer to be flashing. Since a rotating beacon requires a motor and other moving parts, such lights inherently have a service life which is short when compared to lights with no moving parts. Accordingly, relatively frequent periodic maintenance or replacement is required of rotating beacon type anti-collision lights.

A collision avoidance light for aircraft usage, and the same requirement is imposed by many emergency land and water vehicle applications, must provide a highly visible warning signal. The requirement for high visibility dictates that the light which is produced be characterized by high intensity and appear to an observer as flashes or pulses. The generation of such high intensity light pulses, however, must be accomplished without imposing unduly large power consumption requirements on the vehicle's electrical system. Power consumption requirements aside, there is a limit to the amount of light which can be generated by a given source such as, for example, a halogen lamp or a gaseous discharge tube. Obviously, the brighter the light which is generated, the better the anti-collision function will be performed. The requirement of high intensity light pulses coupled with the need for reasonable power consumption dictates that the energy in the visible spectrum which is generated by a given source be used as efficiently as possible. Accordingly, the generated light must be collected and directed so as to maximize visibility taking the particular use environment into account. In the case of an aircraft collision avoidance warning, the requisite radiation pattern is defined by FAA Specification FAR PART-23,1401 and PART 25,1401 and 91.33(c).

There has been a long standing desire for a compact and efficient light, capable of employing either a gaseous discharge tube or a halogen lamp as the light source, which meets the above-referenced FAA Specification and is capable of installation on aircraft either as original equipment or as a replacement for an existing rotating beacon type anti-collision light. While collision avoidance lights having no moving parts have previously been available, these prior lights could not be installed in place of an existing rotating beacon without difficult and expensive rewiring and, in any event, the prior lights were relatively inefficient in their use of the generated light energy and/or in the consumption of electrical power.

SUMMARY OF THE INVENTION

The present invention overcomes the above-briefly discussed and other deficiencies and disadvantages of the prior art and, in so doing, provides a compact and highly efficient means for generating high intensity light pulses which are radiated in accordance with a desired directional pattern. A light in accordance with the present invention may employ, as the light source, either a gaseous discharge tube or an incandescent lamp such as, for example, a halogen lamp. The light source is housed within a lens cover which defines an axis and the source is positioned such that a point within the light emission region thereof lies on that axis. The lens cover has a generally smooth outer surface whereby the lens cover may be easily cleaned and will not be subject to diminished light transmission because of an accumulation of dirt in surface irregularities. The lens cover is provided with a pair of spaced arrays of prismatic inner optics which directly receive and refract light emitted from the source. The lens cover also has regions, including an intermediate portion located between the arrays of prismatic inner optics, through which light will pass without significant redirection.

At least a first multi-quadrant reflector is positioned within the lens cover at the lower end thereof. This reflector is coaxial with the lens cover and includes plural reflective surfaces arranged in a symmetrical, outwardly sloped pattern. Each of these individual reflective surfaces is a portion of a surface of a paraboloid of revolution. These reflective surfaces all have a common focal point which is located on the axis of the lens cover at a point within the light emission region of the source. For some applications, a second similar reflector will be positioned within the lens cover so as to be oppositely disposed from and facing the first reflector. When two reflectors are employed, the common focal points of both reflectors are generally coincident. Restated, the focal points of all of the individual parabolic reflective surfaces will lie on the axis of the lens cover and within the light emission zone of the light source as defined by the filament of an incandescent lamp or approximately the midpoint of the active portion of a gaseous discharge tube. Accordingly, a substantial portion of the light emanating from the source which is incident upon the reflectors will be reflected from the plural reflective surfaces in directions which are generally transverse to the axis of the lens cover. The majority of the reflected light will, in preferred embodiments, pass through regions of the lens cover which are not provided with refracting inner optics. The combination of the lens cover inner optics and transparent regions which are free of optics, the reflector(s) and the location of the light source relative to the inner optics and reflector(s) provides the desired radiation pattern and, most importantly, makes highly efficient use of the available light energy.

When a light assembly in accordance with the present invention employs an incandescent lamp as the light source, the circuitry for causing the lamp to be periodically energized may be housed in the base of the light assembly which, in part, includes a cavity defined by the first or lower one of the multi-quadrant reflectors. Accordingly, such a light assembly may be installed directly in place of an existing rotating beacon and will operate from the same two conductor electrical cable which supplied power to the lamp and motor of the rotating beacon. When a light in accordance with the present invention utilizes a gaseous discharge tube, the trigger transformer for the tube will be installed within the base of the light assembly.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENTS

Figure 1:
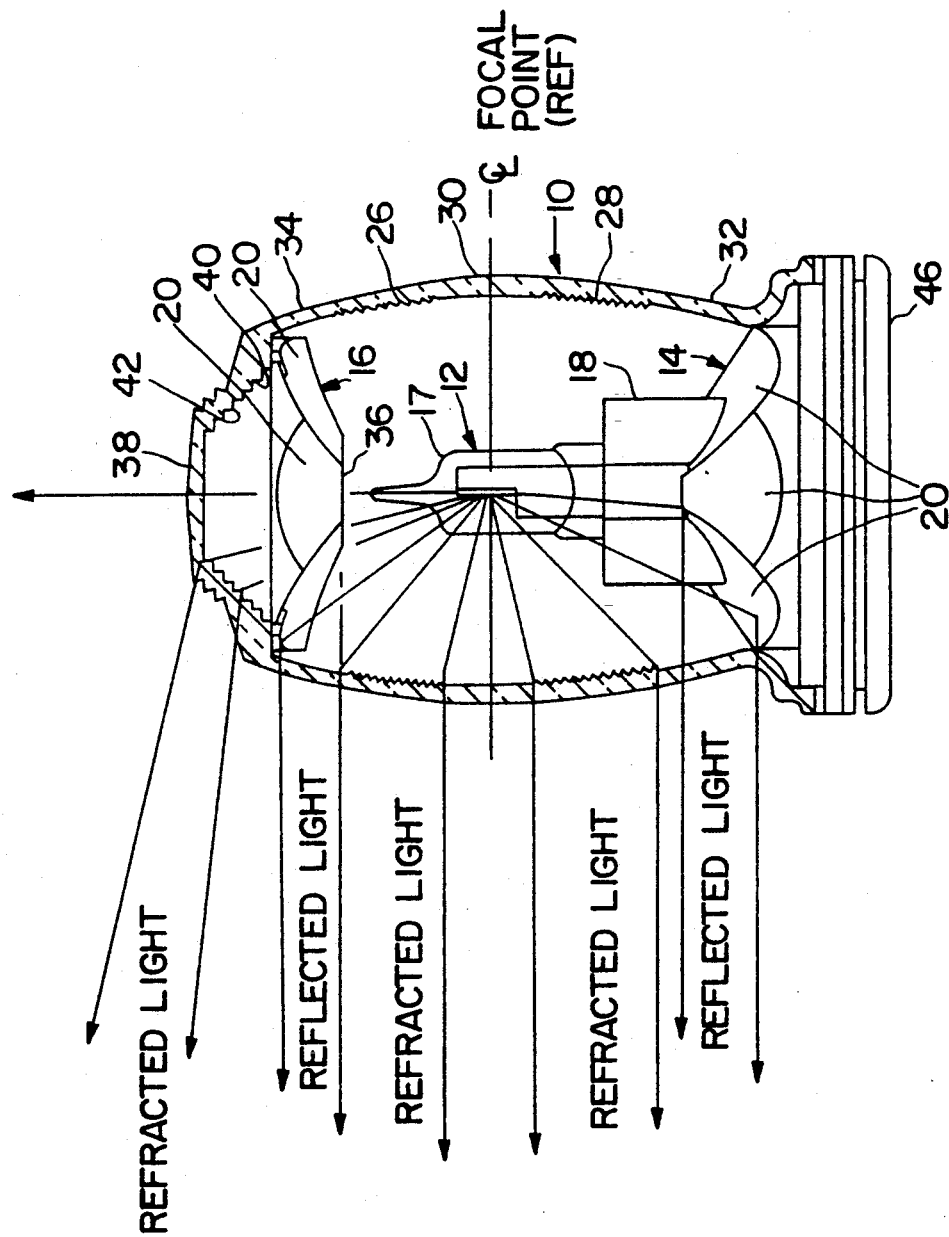
FIG. 1 is a cross-sectional, side elevation view of a light assembly in accordance with the present invention, the light assembly of FIG. 1 employing an incandescent lamp as the light source.

With reference now to FIG. 1, a light assembly in accordance with a first embodiment of the present invention generally comprises a lens cover 10, a light source 12 and a pair of reflectors 14 and 16. The lens cover 10 is generally "barrel" shaped and thus, when viewed in cross-section in a horizontal plane oriented transversely to the FIG. 1 showing, is circular and defines a central axis. As the light assembly is shown in FIGS. 1 and 2, this central axis is vertically oriented.

Figure 2:
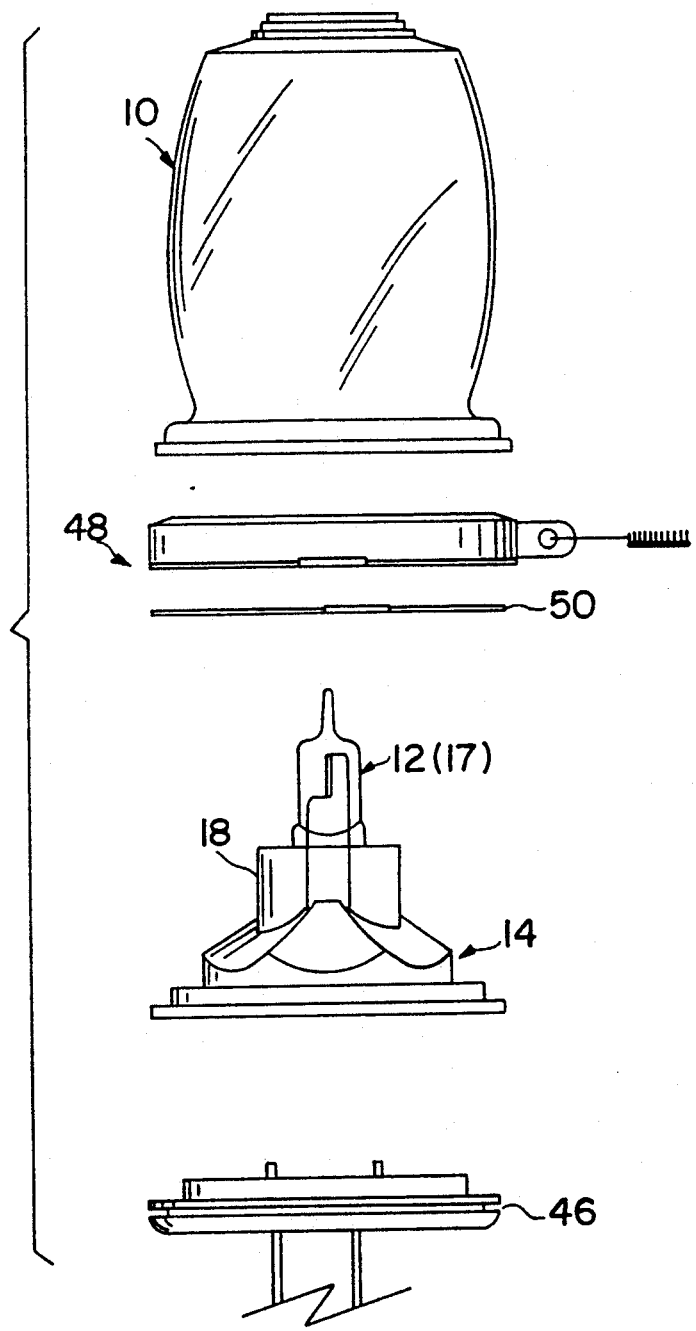
FIG. 2 is an exploded side elevation view of the light assembly of FIG. 1, FIG. 2 depicting the light assembly as it might be disassembled for installation or servicing.

The light source 12, in the embodiment depicted in FIGS. 1 and 2, comprises an incandescent lamp 17, namely a halogen lamp. This lamp is mounted in a socket or lamp holder 18 which, preferably, is formed integrally with the lower reflector 14. The lamp holder 18 is sized and configured to insure that the filament of lamp 17 will be located on the central axis of the lens cover.

Figure 4:
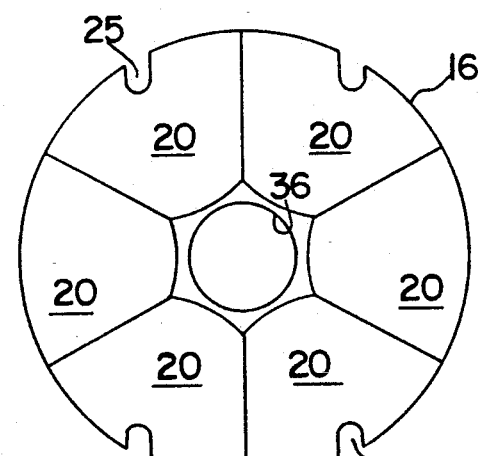
FIG. 4 is a bottom plan view of the reflector of FIG. 3.

The reflectors 14 and 16, as can best be seen by simultaneous consideration of FIGS. 1 and 4, each define plural parabolic reflective surfaces or quadrants 20. In one reduction to practice of the invention, each of the reflectors 14 and 16 included six quadrants, i.e., six reflective surfaces 20. The six surfaces 20 of each reflector are identical in size and shape and are portions of a paraboloid of revolution. Also, for each of reflectors 14 and 16, the paraboloids of revolution share a common focal point. In a typical reduction to practice, the focal length of the paraboloids of revolution of the surfaces 20 of reflector 14 will be longer than the focal length of the paraboloids of revolution of the surfaces 20 of reflector 16. In the embodiment of FIGS. 1 and 2, the common focal points of reflectors 14 and 16 will, to the extent possible taking manufacturing tolerances into account, coincide and will lie on the central axis of the lens cover in the region occupied by the filament of the lamp 17, i.e., at a reference focal point. Accordingly, a large portion of the light emitted by lamp 17 and incident on a reflective surface 20 of either of reflectors 14 or 16 will be reflected in a direction which is generally transverse to the central axis of the lens cover 10 as indicated by arrows on FIG. 1.

Figure 3:
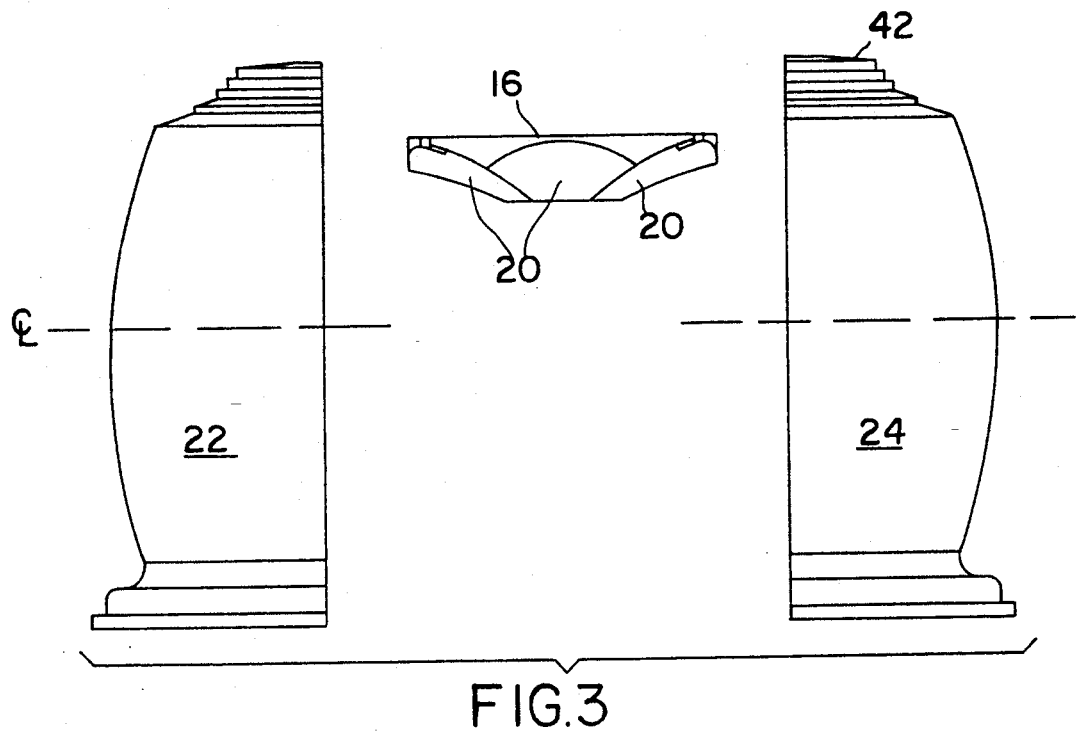
FIG. 3 is an exploded view which depicts the two halves of the lens cover of the embodiment of FIGS. 1 and 2 and the upper reflector prior to the integration thereof into a unitary subassembly.

As may be seen from FIG. 3, the lens cover 10 is formed as two molded halves 22 and 24 which are ultrasonically welded together. The lens cover halves 22 and 24 are provided internally with a plurality of spaced bosses. The upper reflector 16, as may be seen from FIG. 4, is provided with a plurality of cut-outs 25 about its periphery. The cut-outs 25 are sized and spaced to receive the bosses on the lens cover halves. The upper reflector 16, when employed, is positioned between the lens cover halves before they are welded together and the welding operation permanently captures the upper reflector within the lens cover.

Continuing to discuss the lens cover 10, the outer side surface thereof, with the exception of a region immediately adjacent the top of the cover in the disclosed embodiments, is smooth. This smooth outer surface facilitates cleaning and minimizes the accumulation of dirt which would reduce the intensity of the emitted light. The lens cover 10 is provided with spacially displaced upper and lower inner optics, respectively indicated at 26 and 28. The inner optics are defined by arrays of circumferential prismatic surfaces. The prismatic surfaces of each array are individually sized and shaped to refract light emitted from source 12 in the manner depicted in FIGS. 1 and 5. Thus, light emanating from source 12 and directly incident on the inner optics 26, 28 is redirected so as to also be transmitted in a desired direction. In the disclosed embodiments, that direction is transverse to the central axis of the lens cover 10. The curvature of the lens cover is selected to reduce internal reflection from surfaces of the prisms of the internal optics.

The upper and lower arrays of prismatic surfaces, i.e., the upper and lower inner optics 26 and 28, are separated by a transparent intermediate region 30 which, in the disclosed embodiments, is in horizontal registration with the light source 12. Accordingly, light emitted by the source and traveling in a direction which is generally transverse to the central axis of the lens cover, or at an angle which is shallow relative to a plane transverse to the central axis, will not undergo any significant refraction and thus will also be radiated in planes which are transverse to the central axis of the lens cover. The lens cover is further provided with transparent regions 32 and 34 which are respectively in registration with the reflectors 14 and 16 and thus light reflected in the manner described above will also pass through the lens cover without significant refraction. The lens cover 10 can be keyed to the lower reflector lampholder subassembly 14, 18 so as to achieve a predetermined relationship between the orientation of the reflectors 14 and 16 if deemed necessary or desirable. For the typical application, however, no such predetermined relationship has been found to be necessary.

The disclosed embodiments of the invention employ an upper reflector 16. Reflector 16 is provided with a central opening 36 which is coaxial with the lens cover 10 and, accordingly, in vertical alignment with the light source 12. Light emitted by source 12 and traveling upwardly at a shallow angle relative to the axis of the lens cover will pass through opening 36 and through the transparent top 38 of the lens cover 10. The lens cover 10 is further provided, in the upper portion thereof which extends between the transparent top 38 and the upwardly facing side of reflector 16, with both inner and outer optics, respectively indicated at 40 and 42, comprised of circumferential prismatic surfaces. The prismatic surfaces which define optics 40 and 42 redirect some of the light which is transmitted through the opening 36. The allowing of a small fraction of the generated light to be radiated both axially with respect to the lens cover and also angularly upwardly, resulting from redirection caused by the inner and outer optics 40, 42, is deemed desirable for employment of the present invention as an aircraft anti-collision light. However, for some applications, the opening 36 may be omitted or the lens cover 10 may be provided with a further internal reflector and associated optics which will redirect light passing through the opening 36 in a desired direction.

The invention has also been reduced to practice with the upper reflector 16 omitted. In such case, employing the same lens cover as described above and shown in FIGS. 1 and 5, a greater portion of the light generated by source 12 will be radiated angularly upwardly when compared to the FIG. 1 embodiment where the radiated light is concentrated in planes which are oriented transversely relative to the lens cover central axis.

Figure 5:
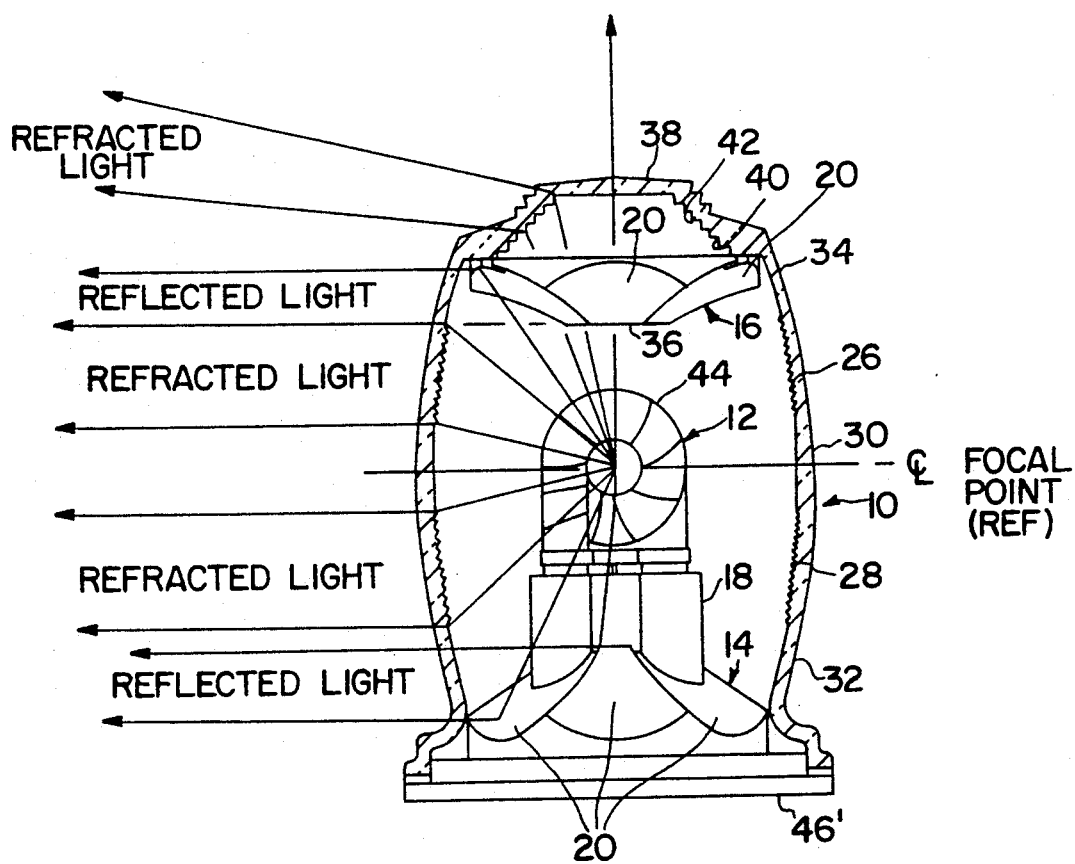
FIG. 5 is a view similar to FIG. 1 which depicts the use of a gaseous discharge tube as the light source of a light assembly in accordance with the invention.

FIG. 5 is a view similar to FIG. 1 but showing the present invention employing a Xenon flash tube 44 as the light source 12. The only difference between the embodiments of FIGS. 1 and 5 is that, in the case of the FIG. 1 embodiment, the mounting base 46 is slightly larger when compared to the mounting base 46' of the FIG. 5 embodiment. The mounting base 46 of the FIG. 1 embodiment will accommodate a circuit board which includes the switching circuitry for causing the incandescent lamp to flash. The embodiment of FIG. 1, accordingly, requires only two conductors for supplying the requisite electrical energy for operation and can be directly substituted for a rotating beacon type anti-collision light without any rewiring of the air frame. In the embodiment of FIG. 5, the trigger transformer for the flash tube is mounted within the lower reflector 14. The FIG. 5 embodiment, of course, requires a three conductor cable for causing periodic energization of the flash tube.

Referring again to FIG. 2, the assembly of the components into a lamp assembly is accomplished through the use of a clamp subassembly which is indicated generally at 48. The three subsystems which must be assembled to define a lamp in accordance with the invention comprise the lens cover 10, which may include an upper reflector 16, the lower reflector subassembly which includes the reflector 14 and its integral light source support 18 with a light generator 12 mounted therein, and the mounting base 46. A gasket 50 will be positioned between lens cover 10 and a peripheral flange on the lower reflector subassembly to hermetically seal the interior of the lens cover from the ambient atmosphere.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. Apparatus for producing pulses of light in the visible spectrum comprising:
    a light generator;
    cover means, said cover means defining an axis;
    means for supporting said light generator within said cover means, said supporting means positioning said light generator so that a light emitting region thereof lies on said cover means axis;
    first reflector means positioned within said cover means for intercepting and redirecting a portion of the light emitted by said light generator, said first reflector means comprising a plurality of parabolic reflective surfaces, said reflective surfaces having a common focal point and being arranged symmetrically about said cover means axis, said common focal point being located approximately on said axis whereby light incident on said first reflector means will be redirected in directions which are generally transverse to said axis; and
    refractor means positioned internally of and integral with said cover means, said refractor means being located to intercept a portion of the light emitted by said light generator means which is not incident on said first reflector means, said refractor means redirecting light incident thereon in directions which are generally parallel to the directions of the light redirected by said first reflector means.

2. The apparatus of claim 1 wherein said first reflector means is coaxial with said cover means and located along said cover means axis at a first side of said light generator and wherein said apparatus further comprises:
    second reflector means positioned within said cover means for intercepting and redirecting a portion of the light emitted by said light generator, said second reflector means comprising a plurality of parabolic reflective surfaces, said reflective surfaces of said second reflective means having a common focal point and being arranged symmetrically about said cover means axis, said common focal point of said second reflector means parabolic reflective surfaces being located approximately on said axis and approximately coincident with said common focal point of said first reflector means whereby light incident on said second reflector means will be redirected in directions which are generally parallel to the directions of the light redirected by said first reflector means, said second reflector means being located along said cover means axis at a second side of said light generator and in a generally facing relationship to said first reflector means.

3. The apparatus of claim 2 wherein said first reflector means is integral with said light generator supporting means.

4. The apparatus of claim 2 wherein said second reflector means further comprises a central aperture aligned with said cover means axis, a portion of the light emitted by said light generator passing through said central aperture and existing said apparatus through a top portion of said cover means.

5. The apparatus of claim 4 wherein said cover means top portion is provided with surface irregularities which define light refracting optics whereby at least a portion of the light which passes through said aperture will be redirected.

6. The apparatus of claim 1 wherein said refractor means comprises a pair of arrays of circumferential prismatic surfaces and wherein said cover means includes a first transparent region located between said first and second arrays of prismatic surfaces, said first transparent region being in alignment with said light generator.

7. The apparatus of claim 6 wherein said first reflector means is coaxial with said cover means and located along said cover means axis a first side of said light generator and wherein said apparatus further comprises;
   second reflector means positioned within said cover means for intercepting and redirecting a portion of the light emitted by said light generator, said second reflector means comprising a plurality of parabolic reflective surfaces, said reflective surfaces of said second reflective means having a common focal point and being arranged symmetrically about said cover means axis, said common focal point of said second reflector means parabolic reflective surfaces being located approximately on said axis and approximately coincident with said common focal point of said first reflector means whereby light incident on said second reflector means will be redirected in directions which are generally parallel to the directions of the light redirected by said first reflector means, said second reflector means being located along said cover means axis at a second side of said light generator and in a generally facing relationship to said first reflector means.

8. The apparatus of claim 7 wherein said second reflector means further comprises a central aperture aligned with said cover means axis, a portion of the light emitted by said light generator passing through said central aperture and existing said apparatus through a top portion of said cover means.

9. The apparatus of claim 6 wherein said cover means includes at least a second transparent region, said second transparent region being located along said axis generally at the level of said first reflector means whereby light redirected by said reflector means will pass through said cover means without significant refraction.

10. The apparatus of claim 9 wherein said first reflector means is coaxial with said cover means and located along said cover means axis a first side of said light generator and wherein said apparatus further comprises;
   second reflector means positioned within said cover means for intercepting and redirecting a portion of the light emitted by said light generator, said second reflector means comprising a plurality of parabolic reflective surfaces, said reflective surfaces of said second reflective means having a common focal point and being arranged symmetrically about said cover means axis, said common focal point of said second reflector means parabolic reflective surfaces being located approximately on said axis and approximately coincident with said common focal point of said first reflector means whereby light incident on said second reflector means will be redirected in directions which are generally parallel to the directions of the light redirected by said first reflector means, said second reflector means being located along said cover means axis at a second side of said light generator and in a generally facing relationship to said first reflector means.

11. The apparatus of claim 10 wherein said second reflector means further comprises a central aperture aligned with said cover means axis, a portion of the light emitted by said light generator passing through said central aperture and existing said apparatus through a top portion of said cover means.

12. The apparatus of claim 11 wherein said first reflector means is integral with said light generator supporting means.

13. The apparatus of claim 16 wherein said cover means top portion is provided with surface irregularities which define light refracting optics whereby at least a portion of the light which passes through said aperture will be redirected.

14. The apparatus of claim 13 wherein said light generator is an incandescent lamp.

15. The apparatus of claim 14 wherein said first reflector means defines a base with an internal cavity and wherein circuitry for periodically interrupting the energization of said incandescent lamp is positioned within said cavity.

16. The apparatus of claim 1 wherein said cover means includes at least a first transparent region, said first transparent region being located along said axis generally at the level of said first reflector means whereby light redirected by said reflector means will pass through said cover means without significant refraction.

17. The apparatus of claim 16 wherein said first reflector means is coaxial with said cover means and located along said cover means axis a first side of said light generator and wherein said apparatus further comprises;
   second reflector means positioned within said cover means for intercepting and redirecting a portion of the light emitted by said light generator, said second reflector means comprising a plurality of parabolic reflective surfaces, said reflective surfaces of said second reflective means having a common focal point and being arranged symmetrically about said cover means axis, said common focal point of said second reflector means parabolic reflective surfaces being located approximately on said axis and approximately coincident with said common focal point of said first reflector means whereby light incident on said second reflector means will be redirected in directions which are generally parallel to the directions of the light redirected by said first reflector means, said second reflector means being located along said cover means axis at a second side of said light generator and in a generally facing relationship to said first reflector means.

18. The apparatus of claim 1 wherein said light generator is an incandescent lamp.

19. The apparatus of claim 18 wherein said first reflector means defines a base with an internal cavity and wherein circuitry for periodically interrupting the energization of said incandescent lamp is positioned within said cavity.

20. The apparatus of claim 1 wherein said light generator is a gaseous discharge tube.

* * * * *

UNITED STATES PATENT AND TRADEMARK OFFICE
CERTIFICATE OF CORRECTION

PATENT NO. : 5,230,560
DATED : July 27, 1993
INVENTOR(S) : Harold W. Lyons

It is certified that error appears in the above-indentified patent and that said Letters Patent is hereby corrected as shown below:

In Column 8, line 12, "16" should read --12--.

Signed and Sealed this

Twentieth Day of February, 1996

Attest:

BRUCE LEHMAN

*Attesting Officer*      *Commissioner of Patents and Trademarks*